Dec. 22, 1970
J. S. JACOBSEN
3,548,508
CENTER LOCATER DEVICE
Filed Nov. 14, 1968
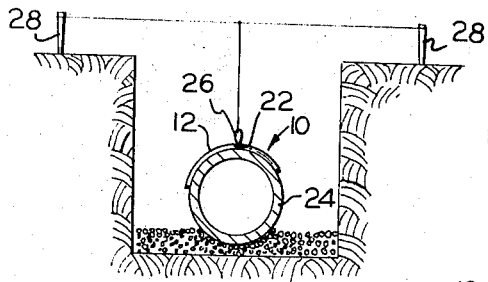
FIG. 1
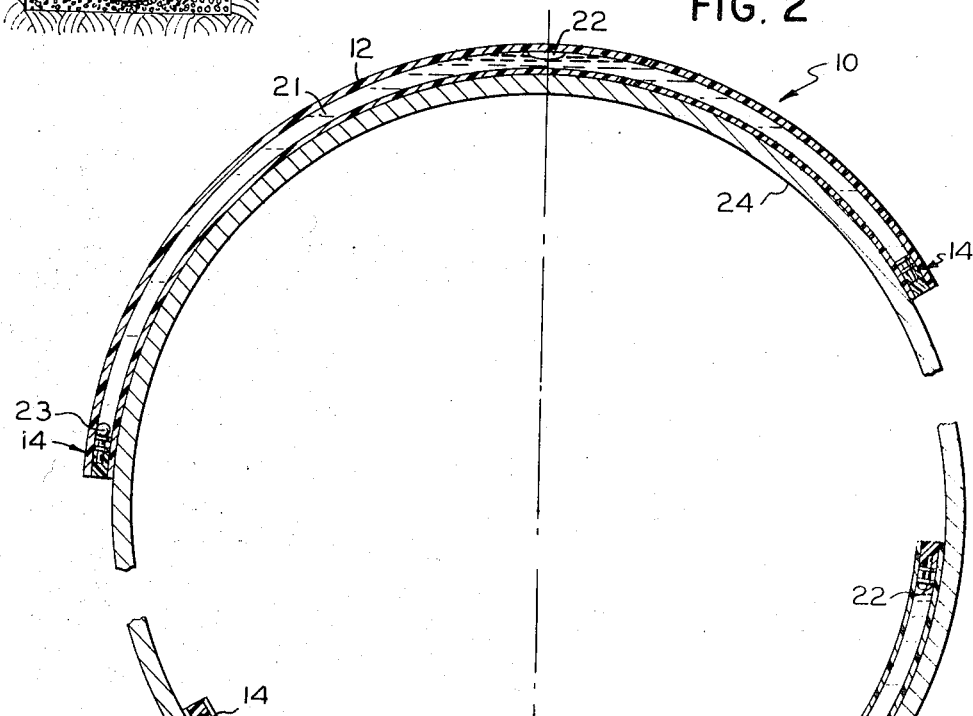
FIG. 2
FIG. 5
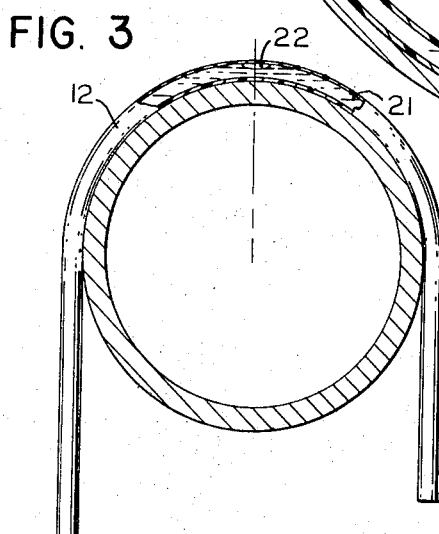
FIG. 3
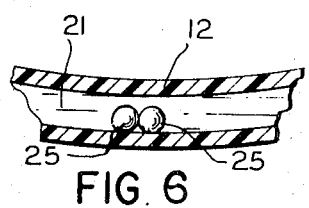
FIG. 6
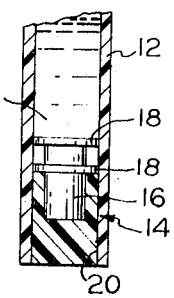
FIG. 4
JON S. JACOBSEN
INVENTOR
BY
BUCKHORN, BLORE, KLARQUIST & SPARKMAN
ATTORNEYS

United States Patent Office 3,548,508
Patented Dec. 22, 1970

3,548,508
CENTER LOCATER DEVICE
Jon S. Jacobsen, Corvallis, Oreg., assignor to
Richard F. Olson
Filed Nov. 14, 1968, Ser. No. 775,610
Int. Cl. G01c 9/24
U.S. Cl. 33—206                                3 Claims

ABSTRACT OF THE DISCLOSURE

A center locater device includes a transparent flexible tube having a length which is large compared to the diameter of the tube. The tube has both ends closed and is filled with a liquid except for a small volume which provides an air bubble. When the locater device is laid across the top of a horizontally disposed cylindrical member, the air bubble assumes a position in which its center is in vertical alignment with the top center of the cylindrical member. A metal ball having a diameter less than the interior diameter of the tube may also be contained in the tube. This ball will assume a position in which its center is in vertical alignment with the bottom center of the cylindrical member, if the locater device is laid in the lower portion of the interior of the cylindrical member so as to extend in a direction generally circumferentially of the member.

BACKGROUND OF THE INVENTION

In installing conduits or other cylindrical members, particularly sewer or drain pipe, it is important not only to maintain the pipe on an accurate grade but also to maintain the various sections of the pipe in accurate alignment with each other and with a desired direction. This requires that the top center near one end of a newly installed section of pipe be accurately located. No satisfactory device for easily and accurately locating such center has appeared on the market. The position of the top center of the pipe has therefore been visually approximated resulting in substantial errors in alignment.

The center locater device of the present invention provides an accurate indication of the top center of a horizontally disposed pipe or other cylindrical member and all that is required is that the device be laid across the top of the member with its two ends positioned approximately the same distance from the top center of the member. That is to say, friction between the pipe and the locater device holds this device in position unless the difference in weight between the two ends is sufficient to cause the device to slide endwise from the cylindrical member. For a locater device which is 18 inches in length, for example, this difference in length will be at least 3 or 4 inches. Also the tube of the locater device may be made of a tough, wear resistant flexible plastic material so that a minimum of care and time is required in handling and positioning of the device. The locater device is particularly advantageous for locating the top center of large diameter cylindrical members but can be scaled down for smaller members if it is desirable to accurately locate the top center of such member.

The tube of the locater device also preferably contains a spherical ball of a material, such as stainless steel, having a specific gravity greater than that of the liquid in the tube so as to enable it to be employed to accurately locate the bottom center of a hollow cylindrical member. If the interior of the cylindrical member is accessible, the locater device may be laid on the inner surface of the lower portion of the member so as to extend generally circumferentially of the member. The ball will then assume a position at the bottom center of the cylindrical member.

If the outside bottom surface of a cylindrical member is accessible, the bottom center of the member can be located by holding the device upwardly against the outside bottom surface so as to extend generally circumferentially of the member. Similarly, if the interior of a hollow cylindrical member is accessible, the top center of the member can be located by holding the device upwardly against the upper inside surface of the member.

It is therefore an object of the invention to provide a center locater device which will enable the top center of a cylindrical member to be quickly and accurately located.

Another object of the invention is to provide a center locater device which will also enable the bottom center of a cylindrical member to be quickly and accurately located.

Specific embodiments of the center locater device of the present invention are shown in the accompanying drawing of which:

FIG. 1 shows a side elevation of a center locater device in position on a pipe shown in lateral cross section in a trench and illustrates one way of testing the alignment of the pipe;

FIG. 2 is a longitudinal cross section of the center locater device in position on the outer surface of the upper portion of a pipe shown in fragmentary lateral cross section;

FIG. 3 is a view of the center locater device partly in longitudinal cross section in position on the upper surface of a pipe of smaller diameter than the pipe shown in FIG. 2;

FIG. 4 is a longitudinal cross section through one end of the center locater device showing a suitable plug for the end of the flexible tube making up the body of the device;

FIG. 5 is a view similar to FIG. 2 showing the center locater device of FIG. 2 laid in the interior of the lower portion of a pipe; and FIG. 6 is a fragmentary longitudinal cross section of a portion of a modified center locater device.

Referring to the drawings, the device 10 of the present invention includes a tube 12 of flexible transparent material closed at its ends by closures 14 so that the tube is fluid tight. A suitable closure 14 is shown in cross section in FIG. 4 and may, for example, include a plug member 16 having a solid cylindrical body portion with a pair of flanges 18 thereon tightly fitting the bore of the tube 12. The member 16 is pushed into the end of the tube 12 to provide a space at the end of the tube. The end of the tube, while inverted from the position shown in FIG. 2, is then filled with a sealing material 20. The tube may be any one of several commercially available tubes made of suitable flexible plastic material, such as polyethylene or polyvinylchloride, the member 18 may be of any molded plastic material or can be of metal, and the sealing material may be any one of several liquid cold setting adhesive like sealing material, such as a polyethylene or epoxy material admixed with a setting catalyst which adheres to the inner walls of the tube and thereafter hardens into a solid body. The length of the tube will in general be many times the diameter of the tube.

Prior to installing the closures 14, the tube 12 is filled with a suitable liquid 21, such as alcohol or a glycerine or glycol and water mixture, leaving sufficient space to provide a gas bubble 22 which will ordinarily be air. The plug members 16 enable the relative volumes of gas and water to be adjusted before the permanent sealing bodies of sealing material are introduced into the ends of the tube and allowed to harden.

Also prior to installing the closures 14, a ball 23 of corrosion resistant material can be positioned in the interior of the tube. This ball is of smaller diameter than the internal diameter of the tube so that it can move in the tube, and, for example, may range in size from about two-thirds to one-third the internal diameter of the tube. Also the ball is preferably of stainless steel but may be of any material which is not corroded or otherwise attacked by the liquid and gas environment in the tube, and which has a specific gravity greater than that of the liquid employed. If the ends of the tube 10 are above its central portion, the ball 23 will move to the lowermost part of the central portion of the tube. It is apparent that, the greater the specific gravity of the material of the ball, the more rapidly the ball will come to rest at the lowermost position in the tube.

When the device 10 is laid across the upper surface of a horizontally disposed cylindrical member, such as the pipe 24 shown in FIGS. 1 and 2, the tube conforms to the upper surface of the cylindrical member and the bubble 22 comes to rest in vertical alignment and adjacent the top center of the cylindrical member. As shown by a comparison of FIG. 3 with FIG. 2, the diameter of the cylindrical member is not critical so long as the tube is sufficiently flexible to conform to the upper surface of the member. Also the position of the tube with respect to such member is not critical as long as the two ends of the tube are close enough in length to sufficiently balance each other that the center locater does not slide endwise from the cylindrical member. When the device is employed in the manner just described, the ball 23 will occupy a position at one end of the tube 12.

Another way of employing the device 10 is to position it crosswise in the lower portion of the interior of a horizontally disposed pipe as shown in FIG. 5. In this case the bubble 22 will be at one end of the tube 10. The ball 23 will, however, move to a position in vertical alignment with and adjacent the bottom center of the pipe.

As indicated above, it is also possible to hold the center locater upwardly against the upper portion of the inner surface of a horizontally disposed hollow cylindrical member to locate the top center of such member or the locater can be held upwardly against the lower portion of the outer surface of a cylindrical member to locate the bottom center of such member. It will be apparent that the cylindrical member referred to need not be a pipe but may be a tank or any other member having a circular cross section or at least a cross section having a curved boundary with its highest or lowest point in vertical alignment with its center or at a known distance laterally of such center. It will also be apparent that the member need not have its longitudinal axis exactly horizontal since such axis may vary considerably from the horizontal without affecting the accuracy of the location of the center of the device.

In the modification shown in FIG. 6, a pair of spherical balls 25 instead of the single ball shown in FIGS. 2 and 5 are positioned in the tube 12. In this case the bottom center of the cylindrical member will be in vertical alignment with the point of contact between the two balls.

By way of example only, one way of utilizing the center locater device is illustrated in FIG. 1. In this figure a plumb bob 26 is suspended by suitable cords between two stakes 28 on opposite sides of a trench in which the pipe 24 is being installed so that the plumb bob is directly above the bubble 22 in the center locater device 10 position on the pipe. A surveying instrument such as a transit can then be employed to sight the plumb bob to determine whether the centerline of the pipe is in the correct position. If the stakes 28 or markers thereon have been accurately positioned, for example, by the use of surveying instruments, measurements from such stakes or markers can also be used to determine whether the centerline of the pipe is in the desired position.

The center locater device of the present invention can be of any desired size and as a specific example for use with large size pipe, such a device may be approximately 18 inches in length and ½ inch in external diameter.

I claim:

1. A center locater device comprising a length of tube of transparent flexible material having its ends closed so as to be fluid tight, said tube containing flowable liquid, a gas bubble, and at least one spherical ball of greater specific gravity than that of said liquid and of smaller diameter than the internal diameter of said tube.

2. The center locater device in accordance with claim 1 in which said tube contains a pair of spherical balls of greater specific gravity than that of said liquid and of smaller diameter than the internal diameter of said tube.

3. A center locater device in accordance with claim 1 in which said ball is of stainless steel.

References Cited

UNITED STATES PATENTS

| | | | |
|---|---|---|---|
| 2,411,165 | 11/1946 | McBride | 33—206 |
| 2,756,512 | 7/1956 | Pettit | 33—206 |
| 3,269,729 | 8/1966 | Morrison | 33—207 |
| 3,311,990 | 4/1967 | Wright | 33—211 |
| 2,483,029 | 9/1949 | Will | 33—206 |

ROBERT B. HULL, Primary Examiner

D. A. DEARING, Assistant Examiner

U.S. Cl. X.R.

33—1, 207, 211